(12) United States Patent
Jeyasingh et al.

(10) Patent No.: US 11,016,833 B2
(45) Date of Patent: May 25, 2021

(54) REMOTE DEBUG FOR SCALED COMPUTING ENVIRONMENTS

(71) Applicant: INTEL CORPORATION, Santa Clara, CA (US)

(72) Inventors: Stalinselvaraj Jeyasingh, Portland, OR (US); Subhankar Panda, Portland, OR (US); David A. Locklear, Portland, OR (US); Steven A. Filary, Beaverton, OR (US); Christopher J. Stedman, Hillsboro, OR (US); Carlos Vallin, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 813 days.

(21) Appl. No.: 15/640,487

(22) Filed: Jul. 1, 2017

(65) Prior Publication Data

US 2019/0004887 A1    Jan. 3, 2019

(51) Int. Cl.
*G06F 11/07* (2006.01)
*G06F 11/14* (2006.01)
*G06F 11/27* (2006.01)
*G06F 11/22* (2006.01)

(52) U.S. Cl.
CPC ...... *G06F 11/0748* (2013.01); *G06F 11/0709* (2013.01); *G06F 11/0793* (2013.01); *G06F 11/1415* (2013.01); *G06F 11/2294* (2013.01); *G06F 11/27* (2013.01)

(58) Field of Classification Search
CPC .... G06F 11/27; G06F 11/3656; G06F 11/263; G06F 11/3648; G06F 11/273; G06F 11/2236; G06F 11/2733; G06F 11/221; G06F 11/2294; G06F 11/26; G06F 11/267; G06F 11/2242; G06F 11/22; G06F 11/24;
(Continued)

(56) References Cited

U.S. PATENT DOCUMENTS 7,293,165 B1* 11/2007 Tobias ...................... G06F 8/66
                                                              713/1
8,201,149 B1    6/2012 Gumtow et al.
9,930,051 B1*  3/2018 Potlapally ............. H04L 9/3247
(Continued)

FOREIGN PATENT DOCUMENTS

WO    2017072664 A1    5/2017

OTHER PUBLICATIONS

International Search Report for the International Patent Application No. PCT/US2018/035749, dated Oct. 26, 2018.

*Primary Examiner* — Amine Riad
(74) *Attorney, Agent, or Firm* — Kacvinsky Daisak Bluni PLLC

(57) ABSTRACT

Techniques and apparatus for remotely accessing debugging resources of a target system are described. A target system including physical compute resources, such as, processors and a chipset can be coupled to a controller remotely accessible over a network. The controller can be arranged to facilitate remote access to debug resources of the physical compute resources. The controller can be coupled to debug pin, such as, those of a debug port and arranged to assert control signals on the pins to access debug resources. The controller can also be arranged to exchange information elements with a remote debug host to include indication of debug operations and/or debug results.

23 Claims, 7 Drawing Sheets

(58) Field of Classification Search
CPC . G06F 11/348; G06F 11/3636; G06F 11/2205
See application file for complete search history.

(56) References Cited

U.S. PATENT DOCUMENTS

| | | | |
|---|---|---|---|
| 10,579,572 B2* | 3/2020 | Kennedy | G06F 13/4027 |
| 2007/0011507 A1* | 1/2007 | Rothman | G06F 11/2736 |
| | | | 714/718 |
| 2013/0326278 A1* | 12/2013 | Yin | G06F 11/3656 |
| | | | 714/38.1 |
| 2017/0024303 A1* | 1/2017 | Christopher | G06F 11/366 |
| 2017/0046228 A1 | 2/2017 | Palayur et al. | |

* cited by examiner

REMOTE DEBUG FOR SCALED COMPUTING ENVIRONMENTS

TECHNICAL FIELD

Embodiments described herein generally relate to accessing distributed computing resources for debugging.

BACKGROUND

Most modern processor components and embedded systems include a debug port. For example, many such hardware devices include an interface to provide debugging functionality, for example, instruction tracing, data tracing, etc. Access to the debug port, and the provided debug functionality, allows operators of the hardware devices to run control and observation resources on the hardware to monitor and/or address fault that may occur during operation of the hardware devices. However, existing paths to the debug port require physical access and proximity to the hardware being debugged. This is impractical for computing environments at scale, such as, data center deployments. Accessing the multiple thousands of individual debug ports in a data center is impractical for a variety of reasons. For example, security requirements can limit the number and/or individuals who are authorized to have physical presence in the data center which is needed to access the debug port on conventional systems. In some deployments, such as rack scale data centers, access to the debug port is not available as the chassis, or rack, is not open.

DETAILED DESCRIPTION

The present disclosure provides a system to remotely access the debug port of hardware components deployed, for example, in a data center. With some implementations, a debug port for physical compute resources can be exposed through a controller interface in a data center. As such, a remote debug host, which can be located outside a data center, can access debug resources available through the debug port via the controller interface. In many computing systems, particularly computing systems at scale such as, data centers, a controller interface is provided to facilitate management of the physical computing elements independently of the host system's firmware (e.g., BIOS, UEFI, or the like) or the host systems operating system. As such, management and control of the computing resources can be provided even when the computing resources may be powered off or otherwise unresponsive by using a network connection to the hardware rather than to an operating system or login shell.

An example of such a controller interface is a baseboard management controller (BMC). In such an example system, a debug port for compute resources can be coupled to the BMC for the compute resources. A connection between a remote debug host and the BMC can be established and debug signals (e.g., joint-test action group (JTAG) signal, or the like) can be accessed and/or controlled. For example, an in-target probe can be implemented to access JTAG signals from a debug port via a secure connection to a BMC. With some examples, the BMC can be arranged to implement a debug driver (e.g., JTAG driver, or the like) for the debug port and expose the debug driver to a remote debug host over a network connection.

Figure 1:
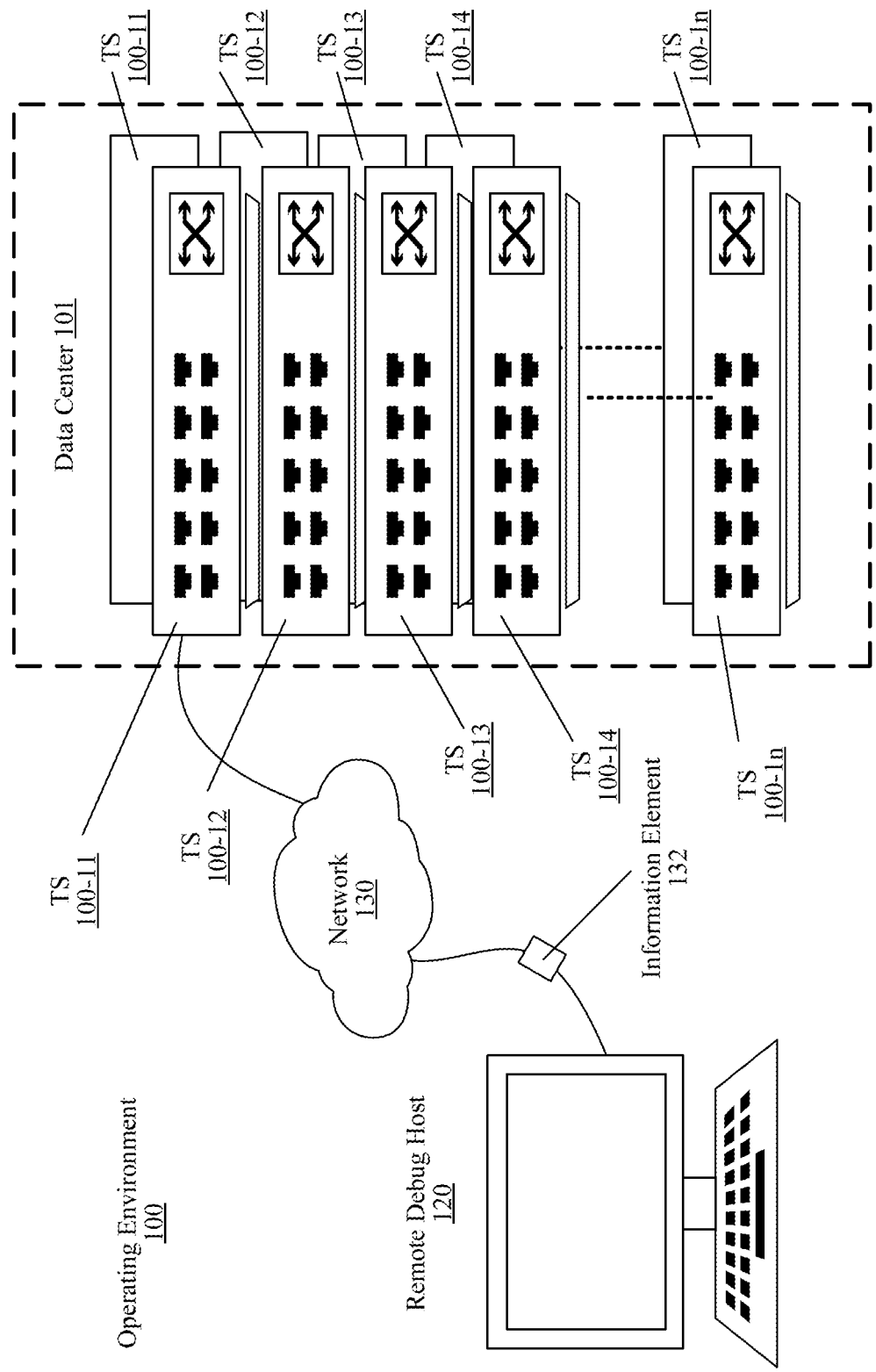
FIG. 1 illustrates an embodiment of an operating environment.

FIG. 1 illustrates an example of an operating environment 100 that may be representative of various embodiments. The operating environment 100 depicted in this figure may include an illustrative data center environment in accordance with some embodiments. In general, a data center is a set of computing resources. For example, a data center can comprise a pool of configurable computing resources, that can be organized into logical collections of computing resources and access to the logical collections of computing resources provided to operators and/or customers of the data center. As another example, a data center can comprise a base computing server or node, which can be expanded with one or more optional expansion servers or nodes. Such a system is often referred to as a converged infrastructure, or a hyper-converged infrastructure. The present disclosure can be applied to any of a variety of types of data center, and the example data centers provided herein are given for clarity of presentation, and not to be limiting.

Operating environment 100 may include a data center comprising several physical computing resources, arranged in racks. For example, data center 101 can including multiple target systems 100-*mn*, where m and n are positive integers, and each target system includes some of the physical computing resources from a pool of physical computing resources within the data center 101. For example, data center 101 is depicted including target systems (TS) 100-11, 100-12, 100-13, 100-14, 100-1*n*, 100-21, 100-22, 100-23, 100-24, and 100-2*n*.

It is noted, that data center 101 can include any number of target systems 100-*mn* supporting a variety of quantities and types of physical computing resources. For example, data center 100 can include physical compute resources, physical memory resources, physical storage resources, physical networking resources, or the like. Furthermore, target systems 100-*mn* can be arranged in zones, rooms, racks, and/or rows and organized into groups based on physical infrastructure and/or resource requirements for data center 101. Furthermore, the physical resources (e.g., compute, memory, storage, accelerator, or the like) of target systems 100-*mn* can be organized (e.g., statically at startup, dynamically during run time, or the like) into logical groups of computing elements to form virtual computing devices, hosts, or the like. Examples are not limited in this context.

The present disclosure provides remote access to a debug port of physical compute resources on the target systems 100-*mn*, by for example, a remote debug host 120. Said differently, remote debug host 120 can access a debug port for physical compute resources on any one of target systems 100-*mn* (e.g., target system 100-11, target system 100-12, target system 100-13, etc.) within data center 101 over network 130. Remote debug host can be any of a variety of computing devices arranged to couple to network 130 and implement debug techniques that rely on a debug port on one of target systems 100-*mn*. For example, remote debug host 120 can be a server, a desktop computer, a network appliance, a laptop, a tablet computing device, a smartphone, or the like.

In general, network 130 can comprise any network, such as, a local area network (LAN) or a wide area network (WAN), internetworks coupled using wired or wireless links deployed using terrestrial or satellite connections, and/or the like. It is noted, that remote debug host need not be physical located within the data center 101. However, remote debug host, over network 130, can remotely access any of a variety of debug resources (e.g., maintenance, monitoring, testing, or the like), which are available via the physical debug port of the target system 100-*mn*. Data exchanged over network 130, may be transferred using any number of network layer protocols, such as Internet Protocol (IP), Multiprotocol Label Switching (MPLS), Asynchronous Transfer Mode (ATM), Frame Relay, and/or the like.

Figure 2:
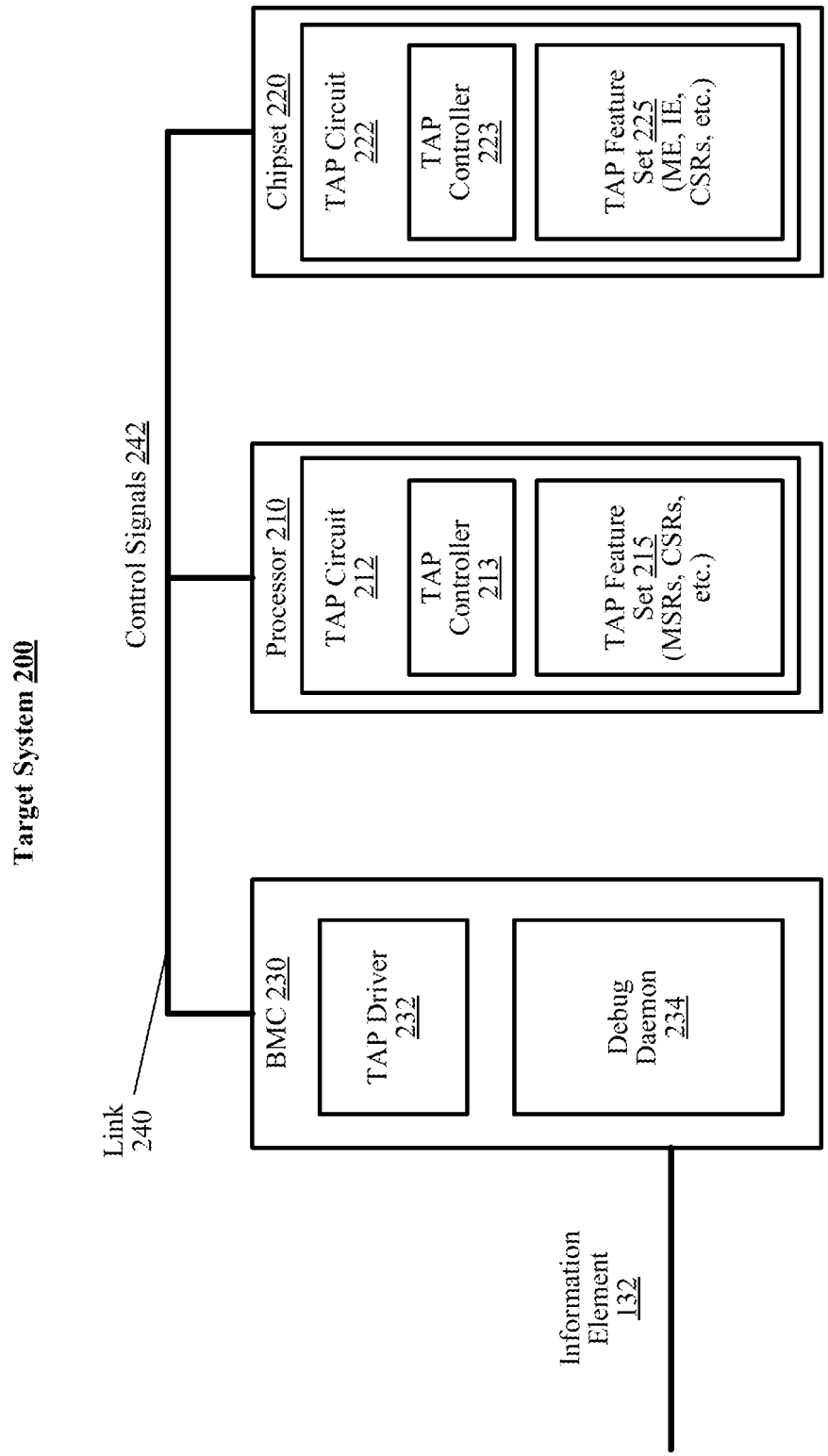
FIG. 2 illustrates an embodiment of a first target system.
Figure 3:
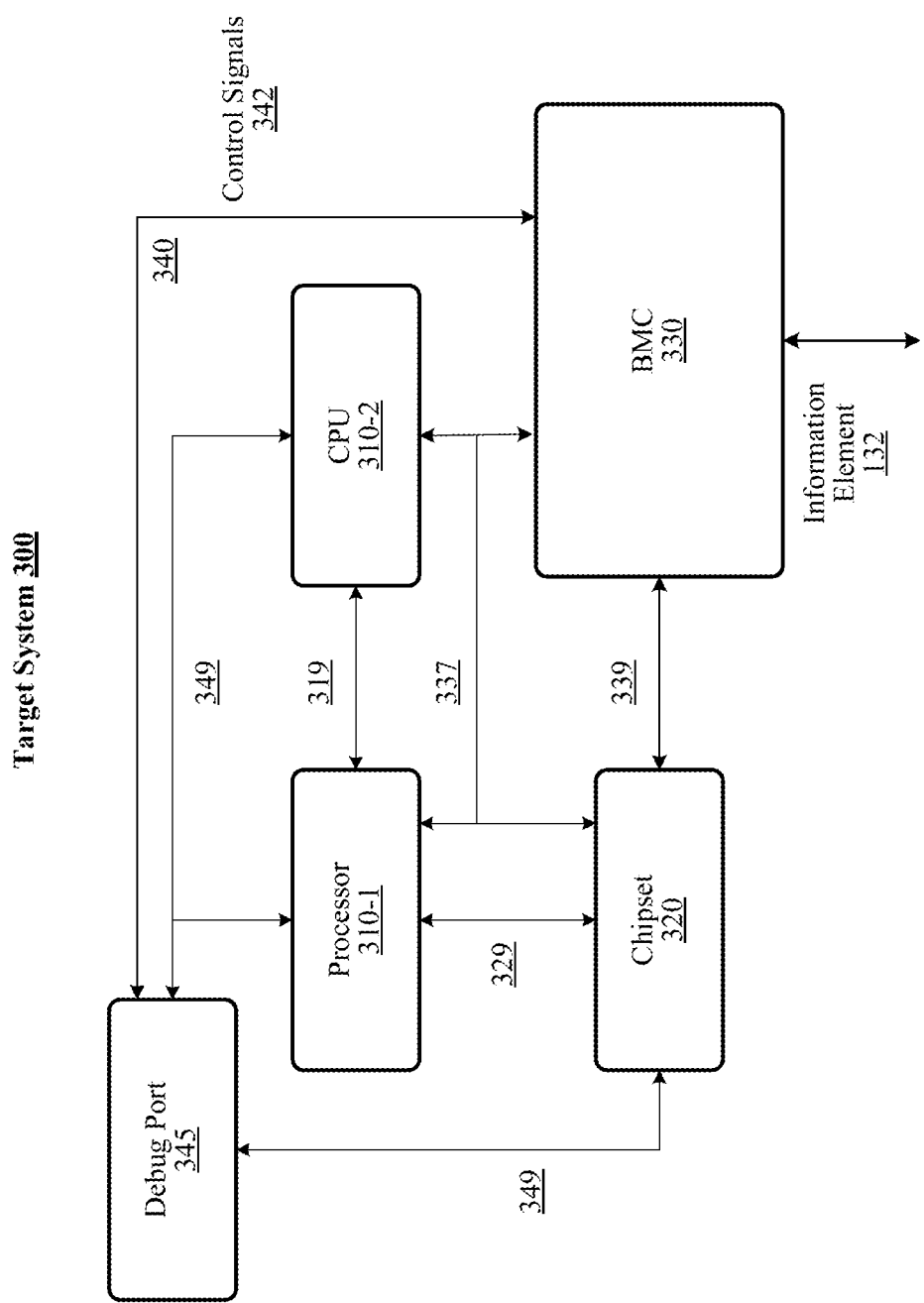
FIG. 3 illustrates an embodiment of a second target system.
Figure 4:
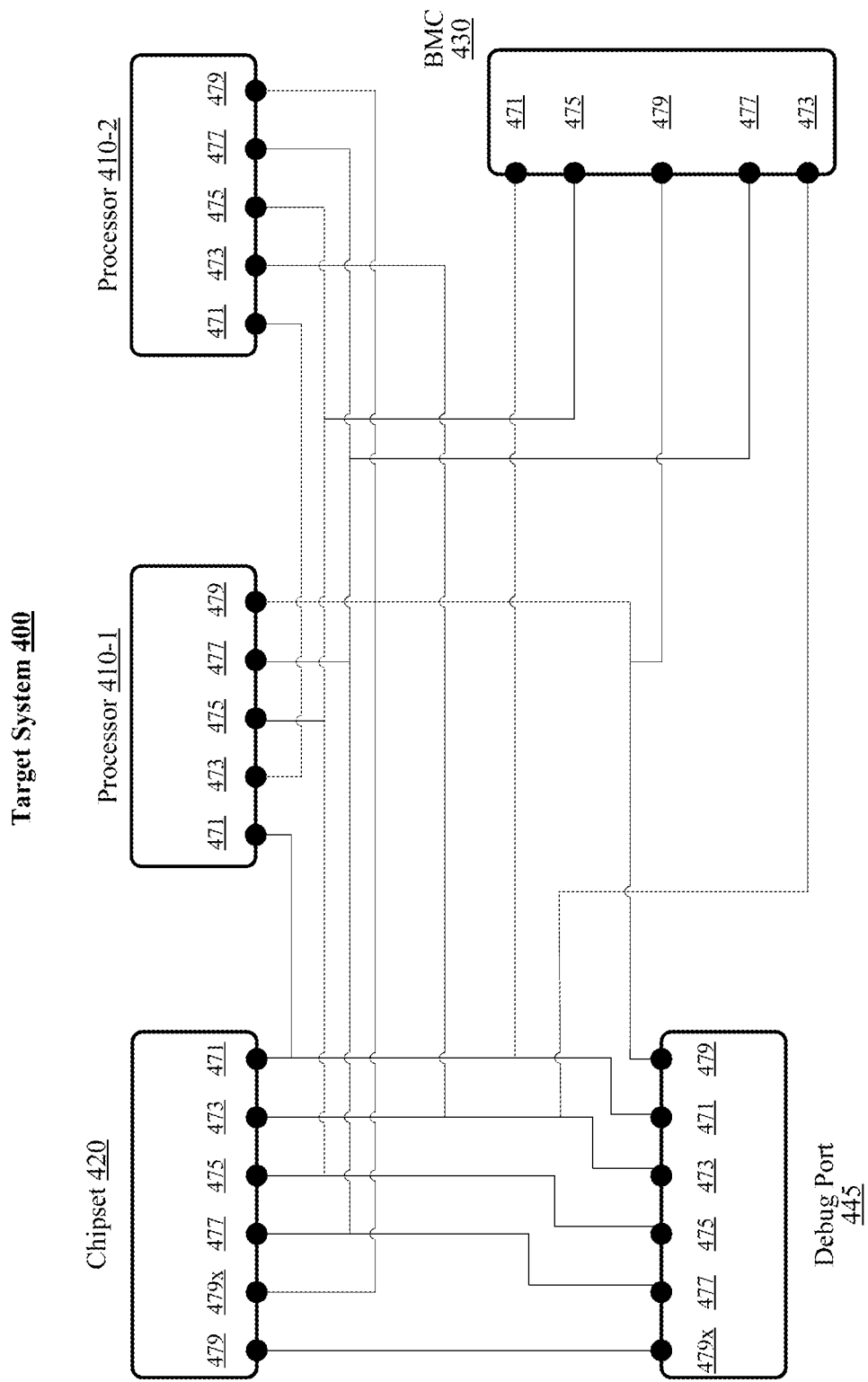
FIG. 4 illustrates an embodiment of a third target system.

FIGS. 2-4 illustrate example target systems 200, 300, and 400, respectively. In general, the target systems 200, 300 and/or 400 can be any one of the target systems 100-*mn* of system 100 depicted in FIG. 1. In general, target systems 200, 300 and 400 each include physical processing resources and a controller coupled to the physical processing resources that is arranged to provide management and/or monitoring of the physical processing resources independently of a host firmware (BIOS or UEFI) and/or operating system. In some examples, the controller can be implemented per the Intelligent Platform Interface Specification, v2.0, published 2013. For example, these figures depict a baseboard management controller (BMC). It is noted, that a BMC is depicted and described in each of these figures for purposes of clarity of personation only. However, any controller operable to provide out-of-band access to physical processing resources (e.g., processor, chipset, or the like) couple be implemented.

Turning more particularly to FIG. 2, target system 200 can include a processor 210, a chipset 220, and a BMC 230. In general, the processor 210 can be any of a variety of processors or logic devices, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, or any other microprocessor or central processing unit (CPU). With some examples, processor 210 can be a commercially available central processing unit (CPU), an application specific integrated circuit (ASIC), a field programmable gate arrays (FPGA), or the like. Additionally, processor 210 can be implemented with any number of processor cores. The embodiments are not limited in this context.

Chipset 220 can comprise hardware logic and circuitry arranged to manage data flow between processor 210 and memory and/or peripherals (not shown) coupled processor 210. For example, chipset 220 could be a northbridge chipset, a southbridge chipsets, a platform control hub (PCH), a Fusion Control Hub (FCH), a custom designed chipset, or the like. It is noted, that an exhaustive list of all possible chipsets is not practical to list here. However, as used herein, "chipset" is intended to mean a hardware circuit arranged to couple a processor circuit to memory, peripherals, or interfaces. BMC 230 can be a controller, at least a portion of which is implemented in hardware, arranged to provide management and/or monitoring of the physical processing resources independently of a host firmware (BIOS or UEFI) and/or operating system.

Each of processor circuit 210 and chipset 220 can include a debug circuit, for example, a test access port (TAP) circuit. Processor 210 includes TAP circuit 212 while chipsets 220 includes TAP circuits 222. It is noted, that TAP circuits are used in the balance of the description to describe a debug circuit. However, this is done for convenience and clarity and not to be limiting. During practice, any hardware circuit providing debug features, such as a TAP circuit, can be implemented. TAP circuits 212 and 222 can include circuitry, at least a portion of which is implemented in hardware, to provide standardized approaches to testing the components in which they are embedded. For example, TAP circuit 212 can include hardware to observing and/or controlling behavior of processor 210 while TAP circuit 222 can include hardware to enable to observing and/or controlling behavior of chipset 222. In some implementations, TAP circuits 212 and 222 can include TAP controllers 213 and 223, respectively, which provide access to TAP circuits. In some examples, TAP controllers 213 and 223 provide access to TAP circuits 212 and 222 via a serial interface. For example, TAP controllers 213 and 223 can include scan cells and/or shift registers to enable control inputs to be read into TAP circuit 212 and 222 and outputs from TAP circuit 212 and 222 to be read out. With some examples, TAP circuits 212 and 222 as well as interfaces 213 and 223 can be implemented in accordance with one or more standards for device testing, such as, IEEE 1149.1-2013, Test Access Port and Boundary-Scan Architecture, published in 2013, often referred to as joint test action group (JTAG).

TAP circuits 212 and 222 additionally include a TAP feature set 215 and 225, respectively. For example, in some implementations, processor 210 can include server model specific registers (MSRs), control/status registers (CSRs), or the like. For example, TAP feature sets 215 can include a MSRs, CRSs, etc. to enable observations, control, debugging, program execution tracing, monitoring, or the like of the processor 210 during operation.

Likewise, chipset 220 can include CSRs, which may be implemented in TAP feature set 225. Furthermore, with some examples, chipset 220 can include a management engine (ME), innovation engine (IE), or the like. In general, an ME or an IE can provide remote out-of-band management of the component in which it is embedded (e.g., chipset 220, or the like). As depicted, TAP feature set 225 can include an ME, an IE, CSRs, etc. to enable observations, control, debugging, program execution tracing, monitoring, or the like of the chipset 220 during operation.

BMC 230 can include a TAP driver 232 and a debug daemon 234. In general, TAP driver 232 can be arranged to couple to TAP controllers 212 and/or 222 via link 240. For example, TAP driver 232 can include circuitry to exchange control signals 242 via link 240 with TAP controller 212 and/or 222. In some implementations, TAP driver 232 can include a hardware input/output queue, such as, for example, a bit bang input output queue. Accordingly, TAP driver 232 can exchange control signals 242 including indications of debug operations and/or debug results with processor 210 and/or chipset 220.

Debug daemon 234 can couple to a remote debug host (e.g., remote debug host 120, or the like) via a network connection (e.g., network connection 130, or the like). In general, debug daemon 234 can send and receive information elements 132 (to/from) a remote debug host including indication of debug operations. For example, debug daemon 234 can be arranged to exchange information elements 132 including indications of debug operations (e.g., JTAG controls, results, or the like) with a remote debug host. In some implementations, debug daemon 234 can encode indications of JTAG controls and/or results within a standard out-of-band communication packet. For example, debug daemon 234 can encode JTAG controls and/or results within a redfish packet used with an intelligent platform management interface (IPMI), or the like. Examples are not limited in this context.

Turning more particularly to FIG. 3, target system 300 can include processors 310-1 and 310-2, chipset 320, BMC 330, and debug port 345. In general, processors 310-1 and 310-2 can be any of a variety of processors or logic devices, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, or any other microprocessor or central processing unit (CPU). With some examples, processors 310-1 and 310-2 can be a commercially available central processing unit (CPU), an application specific integrated circuit (ASIC), a field programmable gate arrays (FPGA), or the like. Additionally, processors 310-1 and 310-2 can be implemented with any number of processor cores. The embodiments are not limited in this context.

Chipset 320 can comprise hardware logic and circuitry arranged to manage data flow between processors 310-1 and/or 310-2 and memory and/or peripherals (not shown) coupled processors 310-1 and/or 310-2. For example, chipset 320 could be a northbridge chipset, a southbridge chipsets, a platform control hub (PCH), a Fusion Control Hub (FCH), a custom designed chipset, or the like. It is noted, that an exhaustive list of all possible chipsets is not practical to list here. However, as used herein, "chipset" is intended to mean a hardware circuit arranged to couple a processor circuit to memory, peripherals, or interfaces. BMC 330 can be a controller, at least a portion of which is implemented in hardware, arranged to provide management and/or monitoring of the physical processing resources independently of a host firmware (BIOS or UEFI) and/or operating system.

Processors 310-1 and 310-2 can be coupled together via link 319. Likewise, chipset 320 can be coupled to one or more of the processors 310-1 and/or 310-2 via link 329. Processors 310-1, 310-2 and chipset 320 can be coupled to BMC 330 via link 337, and chipset 320 can be coupled to BMC 330 via link 339. In some examples, links 319 and 329 can be any one of a front-side bus, a Hyper Transport link, a QuickPath Interconnect, an UltraPath Interconnect (UPI), a Direct Media Interface (DMI), a Platform Environment Control Interface (PECI), an Intelligent Platform Management Interface (IPMI), or the like.

Debug port 345 can be an extended debug port (XDP), or other debug port arranged to provide access to JTAG signals. Debug port 345 can be coupled to processors 310-1 and 310-2 and to chipset 320 via link 349. In some examples, link 349 can be a link arranged to provide control signals (e.g., in serial, or the like) in accordance with a specification promulgated by JTAG. Conventionally, access to debugging resources on target system 300 would be through physically attaching a debug probe to debug port 345. However, the present disclosure provides that debug port 345 can be coupled to BMC 330, for example, via link 340. During operation, BMC 330 can exchange control signals 342 with processor 310-1, 310-2 and/or chipset 320 via debug port 345 and links 340/349. Furthermore, BMC 330 can exchange information elements 132 with a remote debug host (e.g., remote debug host 120 of FIG. 1, or the like). Information elements 132 can include indications of debug operations (e.g., JTAG controls, results, or the like). For example, information elements 132 can be formatted in accordance with an intelligent platform management interface (IPMI), or the like. As a specific example, information elements 132 can be redfish packets. Indications of debug operations and/or debug results can be encoded into the redfish packets and exchanged with a remote debug host. Thus, the present disclosure provides a significant advantage over conventional systems in that debug operations for target system 300 can be accessed without physically attaching a test probe to debug port 345.

Turning more particularly to FIG. 4, target system 400 can include processors 410-1 and 410-2, chipset 420, BMC 430, and debug port 445. In general, processors 410-1 and 410-2 can be any of a variety of processors or logic devices, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, or any other microprocessor or central processing unit (CPU). With some examples, processors 410-1 and 410-2 can be a commercially available central processing unit (CPU), an application specific integrated circuit (ASIC), a field programmable gate arrays (FPGA), or the like. Additionally, processors 410-1 and 410-2 can be implemented with any number of processor cores. The embodiments are not limited in this context.

Chipset 420 can comprise hardware logic and circuitry arranged to manage data flow between processors 410-1 and/or 410-2 and memory and/or peripherals (not shown) coupled processors 410-1 and/or 410-2. For example, chipset 420 could be a northbridge chipset, a southbridge chipsets, a platform control hub (PCH), a Fusion Control Hub (FCH), a custom designed chipset, or the like. It is noted, that an exhaustive list of all possible chipsets is not practical to list here. However, as used herein, "chipset" is intended to mean a hardware circuit arranged to couple a processor circuit to memory, peripherals, or interfaces. BMC 430 can be a controller, at least a portion of which is implemented in hardware, arranged to provide management and/or monitoring of the physical processing resources independently of a host firmware (BIOS or UEFI) and/or operating system.

Each of processors 410-1, 410-2 and chipset 420 can include several pins or straps, arranged to facilitate debug per various debugging standards, such as, those promulgated by JTAG. For example, each of processors 410-1 and 410-2 can include debug input pins 471 and debug output pins 473. Additionally, each of processors 410-1 and 410-2 can include a test mode select pin 475 and a test reset pin 477. Furthermore, each of processors 410-1 and 410-2 can include a test mode clock input 479. Chipset 420 can include debug input and output pins 471 and 473, respectively as well as a test mode select pin 475, test reset pin 477 and multiple test mode clock pins 479. For example, chipset 420 is depicted including test mode clock pins 479 and 479x.

Debug port 445 can include pins arranged to facilitate attaching a debugging probe to target system 400 to access debugging features (e.g., TAP circuit 212, TAP circuit 222, or the like) provided by processors 410-1, 410-2, and/or chipset 420. For example, debug port 445 can include a debug input pin 471, a debug output pin 473, a test mode select pin 475, a test reset pin 477, and one or more test mode clock pins 479. For example, debug port 445 is depicted including test mode clock pins 479 and 479x. It is noted, that there can be a variety of different pins available for implementing a JTAG compliant debugging systems, including a JTAG compliance processor, chipset, and debug port. The example pins depicted in this figure are given for illustration purposes only. Furthermore, several pins which are commonly implemented are not depicted for purposes of clarity. For example, PREQ/PRDY, RSMRST, CPU_POW-RGD, PLTRST, DEBUG_EN pins to provide associated control signals are often provided for JTAG compliant systems. Target system 400 could implement such pins without departing from the scope of the claimed subject matter. Examples are not limited in this context.

Furthermore, it is noted that a variety of techniques and options exit to couple multiple processors (e.g., processor 410-1 and 410-2) to a debug port (e.g., debug port 445). The connection scheme depicted in this figure is given for purposes of explanation only, and not to be limiting. As depicted, debug input pin 417 of processor 410-2 is coupled to debug output pin 473 of processor 410-1 while the debug input pin 471 of processor 410-1 is coupled to the debug input pins 471 of each of the chipset 420, debug port 445, and BMC 430. The debug output pin 473 of processor 410-2 is coupled to the debug output pin of each of each of the chipset 420, debug port 445, and BMC 430. The test mode select pin 475 of each of the processor 410-1, processor 410-2, chipset 420, debug port 445 and BMC 430 are coupled together. The test reset pin 477 of each of the processor 410-1, processor 410-2, chipset 420, debug port 445 and BMC 430 are coupled together. Additionally, the test mode clock pins 479 (and 479x) of each of the processor 410-1, processor 410-2, chipset 420, debug port 445 and BMC 430 are coupled together.

Accordingly, a remote debug host (e.g., remote debug host 120) can access debug resources on target system 400. For example, a remote debug host can access debug resources on a target system via connecting to a BMC and accessing the JTAG pins coupled to the BMC as detailed herein.

Figure 5:
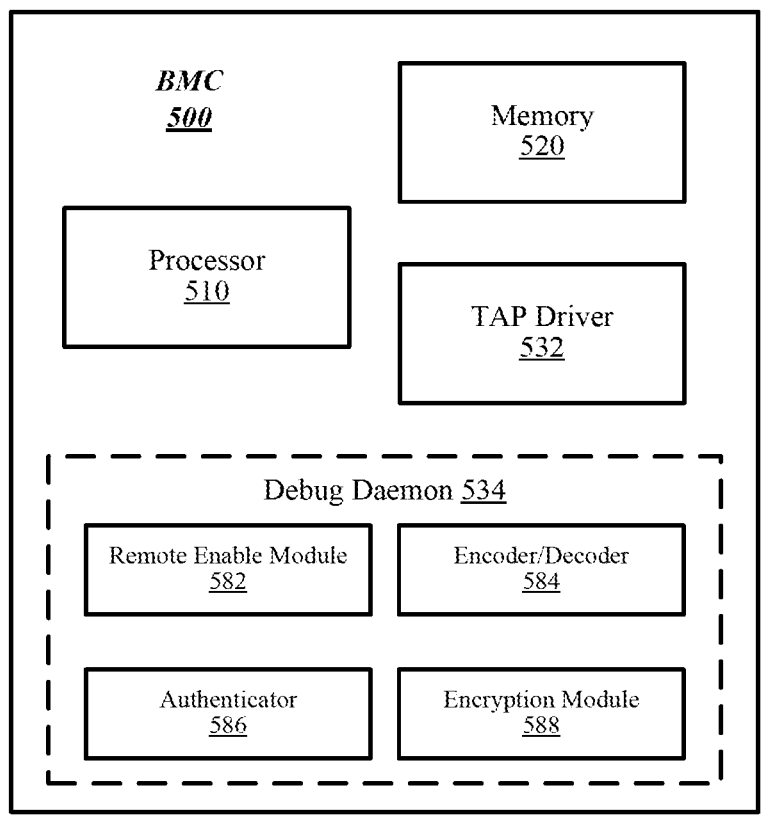
FIG. 5 illustrates an embodiment of a first baseboard management controller.

FIG. 5 depicts an example baseboard management controller 500, which can be implemented as one of the BMCs depicted herein, such as, for example, BMC 230, BMC 330, and/or BMC 430. BMC 500 can include a processor 510 and a memory 520. In general, processor 510 can include any of a variety of processor components arranged to execute instructions, such as, for example, instructions stored on memory 520. Memory 520 can include any of a variety of computer-readable medium arranged to store indications of data, information, instructions. For example, memory 520 can be read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, or the like. Although not depicted, memory 520 can include indications of components (and associated characteristics, settings, parameters, or the like) coupled to BMC (e.g., processor 210, chipset 220, or the like). Furthermore, memory 520 could include a control routine and/or instructions, which when executed by processor 510, cause BMC 500 to implement techniques to provide remote debug access (e.g., by remote debug host) via a network connection (e.g., network 130, or the like).

BMC 500 can include TAP Driver 532 and debug daemon 534. In general, TAP driver 532 can be arranged to execute low level hardware operations with the debug resources of other components on a target system (e.g., pins 471, 473, 475, 477, 479, etc.). For example, TAP driver 232 can include circuitry to assert and/or read signals from debug pins of processor component and/or chipsets on the target system to which the BMC 500 is implemented.

Debug daemon 534 can include a remote enable module 582, an encoder/decoder module 584, an authenticator 586, and an encryption module 588. In some examples, remote enable module 582 can be arranged to enable and/or disable a remote debug mode. For example, remote enable module 582 can enable and/or disable access to debug features (e.g., TAP feature set 215, TAP feature set 225, or the like) by a remote debug host. In some examples, remote enable module 582 can include a hardware strap to isolate the BMC 500 from debug control features. In some examples, remote enable module 582 can include a register or pin which is set or asserted during startup, when a probe is physically attached to a debug port (e.g., debug port 345, debug port 445, or the like).

Encoder/Decoder 584 can be arranged to decode indications of debugging operations from information elements sent via a network (e.g., information elements 132 send over network 130, or the like). Additionally, encoder/decoder 584 can be arranged to encode indications of debugging operations into information elements sent via a network (e.g., information elements 132 send over network 130, or the like). Authenticator 586 can be arranged to authenticate a user and/or remote debug host. For example, authenticator 586 can be arranged to only allow remote access to debugging features upon an explicit command (e.g., IPMI command, or the like) and authentication of the user and/or device asserting the command. Encryption module 588 can be arranged to decrypt and/or encrypt information elements communicated with a remote host.

Figure 6:
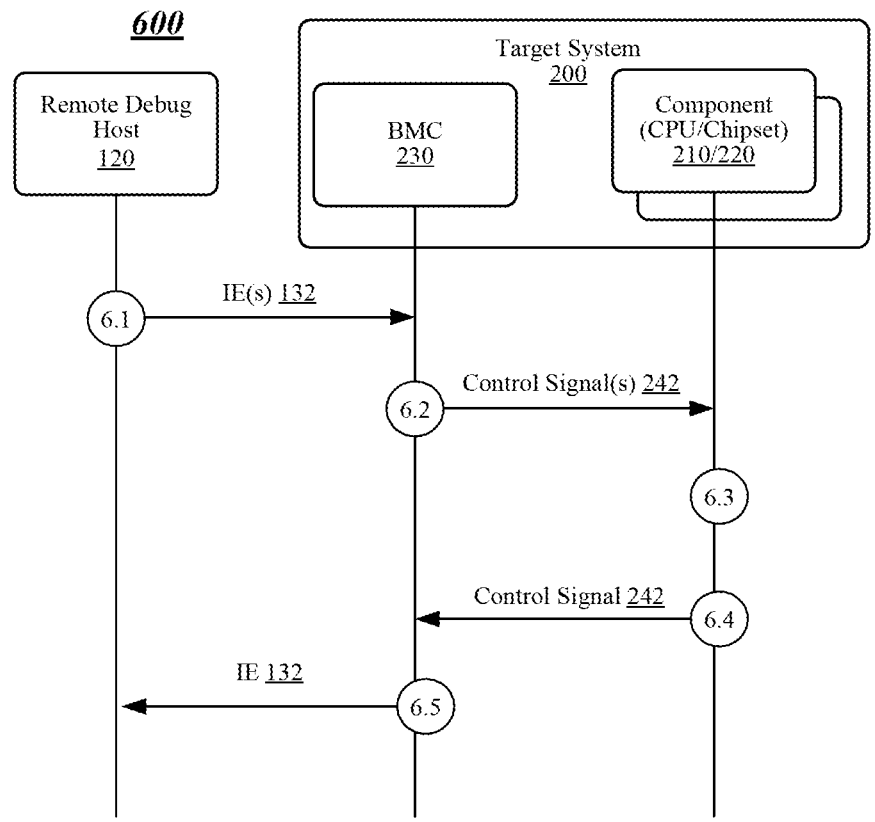
FIG. 6 illustrates an embodiment of a first technique.

FIG. 6 illustrates an embodiment of a technique 600. Technique 600 may be representative of some or all the operations executed by one or more embodiments described herein, such as operations executed by components of system 100 in remotely accessing debugging resources of a target system. It is noted, that technique 600 is described while referencing the remote debugging host 120 of system 100 depicted in FIG. 1 and the target system 200 depicted in FIG. 2. However, technique 600 could be implemented by any of a variety of systems to remotely access debugging resources of a target system, specifically, by remotely accessing debugging resources via a network and a target system controller, such as, a BMC.

Technique 600 can begin at circle 6.1. At circle 6.1, remote debug host 120 can send information elements (IEs) 132 including an indication to access remote debugging features of the target system to a BMC for the system. For example, at circle 6.1, remote debugging host 120 can send information elements 132 to BMC 230 of target system 200. Information elements 132 can include an indication to initiate debugging, an indication to authenticate remote debug host 120, or an indication of a debug resource and/or operation to access. In some examples, remote debugging host 120 can sent information element(s) 132 to BMC 230 via a network (e.g., network 130) or the like.

Continuing to circle 6.2, BMC 230 can assert control signal(s) 242 to a component of target system 200, such as, processor 210-1, processor 210-2, chipset 220, or the like. For example, BMC 230 can assert control signal(s) including indication to implement debugging operations via link(s) 240. Continuing to circle 6.3, the component (e.g., processor 210-1, processor 210-2, chipset 220, or the like) can implement the debugging operation specified in the control signals received at circle 6.2.

Continuing to circle, 6.4, the component (e.g., processor 210-1, processor 210-2, chipset 220, or the like) can send a control signal to BMC 230 including an indication of the results of the debugging operation implemented at circle 6.3. Continuing to circle 6.5, BMC 230 can send information element(s) to remote debugging host 120 including an indication of the results of the debugging operation received at circle 6.4.

Figure 7:
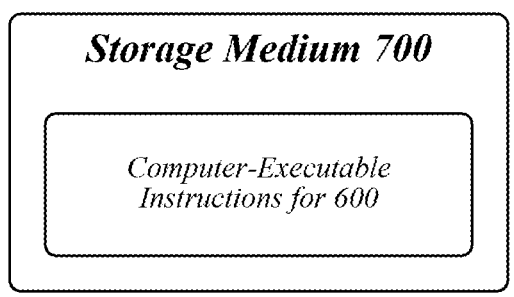
FIG. 7 illustrates an embodiment of a storage medium.

FIG. 7 illustrates an example of a storage medium 700. Storage medium 700 may comprise an article of manufacture. In some examples, storage medium 700 may include any non-transitory computer readable medium or machine readable medium, such as an optical, magnetic or semiconductor storage. Storage medium 700 may store various types of computer executable instructions, such as instructions to implement technique 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
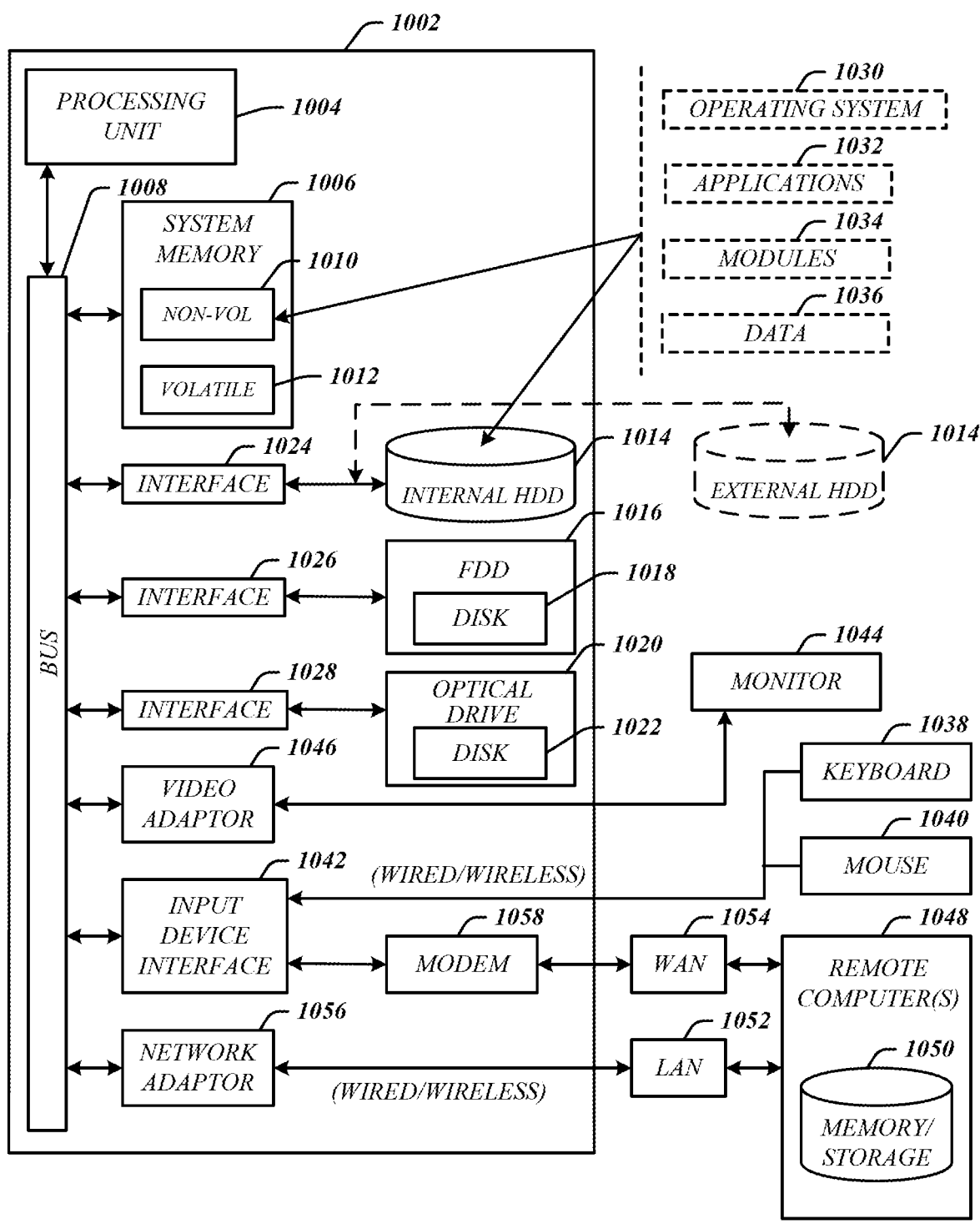
FIG. 8 illustrates an example computing platform.

FIG. 8 illustrates an embodiment of an exemplary computing architecture 1000 suitable for implementing various embodiments as previously described. In various embodiments, the computing architecture 1000 may comprise or be implemented as part of an electronic device. In some embodiments, the computing architecture 1000 may be representative, for example, of remote debug host 120, target systems 100-mn, BMC 230, BMC 330, BMC 430, BMC 500, or the like. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As depicted, the computing architecture 1000 comprises a processing unit 1004, a system memory 1006 and a system bus 1008. The processing unit 1004 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1004.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1384 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of remote debug host 120, BMC 230, BMC 330, BMC 430, BMC 500, or the like.

A user can enter commands and information into the computer 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 1384 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following provide further example embodiments:

Example 1

An apparatus for a physical compute resource in a data center, comprising: a processor comprising a debug circuit; and a management controller coupled to the debug circuit of the processor, the management controller comprising logic, at least a portion of which is implemented in hardware, the logic to: receive, via a network, an information element including an indication of a debug operation; and send a control signal to the debug circuit of the processor including an indication to implement the debug operation.

Example 2

The apparatus of claim 1, the management controller comprising logic to: receive a control signal from the debug circuit including an indication of a debug result; and send, via the network, an information element including an indication of the debug result.

Example 3

The apparatus of claim 1, the management controller comprising a baseboard management controller (BMC).

Example 4

The apparatus of claim 1, comprising a chipset comprising a debug circuit, the management controller coupled to the debug circuit of the chipset and comprising logic to: send a control signal to the debug circuit of the chipset including an indication to implement the debug operation; receive a control signal from the debug circuit of the chipset including an indication of a debug result; and send, via the network, an information element including an indication of the debug result.

Example 5

The apparatus of claim 1, the debug circuit of the processor comprising a plurality of debug circuit pins, the management controller comprising a plurality of debug circuit pins operably coupled to respective ones of the plurality of debug circuit pins of the debug circuit of the processor.

Example 6

The apparatus of claim 5, the management controller comprising logic to apply a voltage to a one of the plurality of debug circuit pins of the debug circuit of the processor to send the control signal to the debug circuit of the processor.

Example 7

The apparatus of claim 6, the management controller comprising logic to read a voltage from one of the plurality of debug circuit pins of the debug circuit of the processor to receive the control signal to the debug circuit of the processor.

Example 8

The apparatus of claim 5, the plurality of debug circuit pins comprising at least an input pin, an output pin, a reset pin, a mode select pin, and a clock pin.

Example 9

The apparatus of claim 1, the processor a first processor and the debug operation a first debug operation, the apparatus comprising a second processor comprising a debug circuit, the management controller coupled to the debug circuit of the second processor and comprising logic to: receive, via a network, an information element including an indication of a second debug operation to apply to the second processor; and send a control signal to the debug circuit of the second processor including an indication to implement the second debug operation.

Example 10

A system for a physical compute resource in a data center, comprising: at least one target system, comprising: a processor comprising a debug circuit; and a management controller coupled to the debug circuit of the processor, the management controller comprising logic, at least a portion of which is implemented in hardware, the logic to: receive, via a network, an information element including an indication of a debug operation; and send a control signal to the debug circuit of the processor including an indication to implement the debug operation.

Example 11

The system of claim 10, the management controller comprising logic to: receive a control signal from the debug circuit including an indication of a debug result; and send, via the network, an information element including an indication of the debug result.

Example 12

The system of claim 10, the management controller comprising a baseboard management controller (BMC).

Example 13

The system of claim 10, the target system comprising a chipset comprising a debug circuit, the management controller coupled to the debug circuit of the chipset and comprising logic to: send a control signal to the debug circuit of the chipset including an indication to implement the debug operation; receive a control signal from the debug circuit of the chipset including an indication of a debug result; and send, via the network, an information element including an indication of the debug result.

Example 14

The system of claim 10, the debug circuit of the processor comprising a plurality of debug circuit pins, the management controller comprising a plurality of debug circuit pins operably coupled to respective ones of the plurality of debug circuit pins of the debug circuit of the processor.

Example 15

The system of claim 14, the management controller comprising logic to apply a voltage to a one of the plurality of debug circuit pins of the debug circuit of the processor to send the control signal to the debug circuit of the processor.

Example 16

The system of claim 15, the management controller comprising logic to read a voltage from one of the plurality of debug circuit pins of the debug circuit of the processor to receive the control signal to the debug circuit of the processor.

Example 17

The system of claim 14, the plurality of debug circuit pins comprising at least an input pin, an output pin, a reset pin, a mode select pin, and a clock pin.

Example 18

The system of claim 10, the processor a first processor and the debug operation a first debug operation, the apparatus comprising a second processor comprising a debug circuit, the management controller coupled to the debug circuit of the second processor and comprising logic to: receive, via a network, an information element including an indication of a second debug operation to apply to the second processor; and send a control signal to the debug circuit of the second processor including an indication to implement the second debug operation.

Example 19

A method for a management controller in a data center, comprising: receiving, via a network at a management controller for a target system, an information element including an indication of a debug operation, the target system comprising at least one processor comprising a debug circuit and the management controller coupled to the debug circuit of the processor; and sending a control signal to the debug circuit of the processor including an indication to implement the debug operation.

Example 20

The method of claim 19, comprising: receiving a control signal from the debug circuit including an indication of a debug result; and sending, via the network, an information element including an indication of the debug result.

Example 21

The method of claim 19, the debug circuit of the processor comprising a plurality of debug circuit pins, the management controller comprising a plurality of debug circuit pins operably coupled to respective ones of the plurality of debug circuit pins of the debug circuit of the processor, the method comprising: applying a voltage to a one of the plurality of debug circuit pins of the debug circuit of the processor to send the control signal to the debug circuit of the processor; and reading a voltage from one of the plurality of debug circuit pins of the debug circuit of the processor to receive the control signal to the debug circuit of the processor.

Example 22

The method of claim 21, wherein the management controller is a baseboard management controller.

Example 23

The method of claim 21, the target system comprising a chipset comprising a debug circuit, the management controller coupled to the debug circuit of the chipset, the method comprising: sending a control signal to the debug circuit of the chipset including an indication to implement the debug operation; receiving a control signal from the debug circuit of the chipset including an indication of a debug result; and sending, via the network, an information element including an indication of the debug result.

Example 24

The method of claim 21, the plurality of debug circuit pins comprising at least an input pin, an output pin, a reset pin, a mode select pin, and a clock pin.

Example 25

The method of claim 19, the processor a first processor and the debug operation a first debug operation, the target system comprising a second processor comprising a debug circuit, the management controller coupled to the debug circuit of the second processor, the method comprising: receiving, via the network at the management controller, an information element including an indication of a second debug operation to apply to the second processor; and sending a control signal to the debug circuit of the second processor including an indication to implement the second debug operation.

Example 26

An apparatus for a management controller in a target system of a data center, the apparatus comprising: network interconnect means to receive, via a network, an information element including an indication of a debug operation, the target system comprising at least one processor comprising a debug circuit and the management controller coupled to the debug circuit of the processor; and debug probe means to send a control signal to the debug circuit of the processor including an indication to implement the debug operation.

Example 27

The apparatus of claim 26, comprising: the debug probe means to receive a control signal from the debug circuit including an indication of a debug result; and the network interconnect means to send, via the network, an information element including an indication of the debug result.

Example 28

The apparatus of claim 26, the debug circuit of the processor comprising a plurality of debug circuit pins, the management controller comprising: a plurality of debug circuit pins: coupling means to operably couple the plurality of debug circuit pins of the management controller to respective ones of the plurality of debug circuit pins of the debug circuit of the processor: the debug probe means to apply a voltage to a one of the plurality of debug circuit pins of the debug circuit of the processor to send the control signal to the debug circuit of the processor, and read a voltage from one of the plurality of debug circuit pins of the debug circuit of the processor to receive the control signal to the debug circuit of the processor.

Example 29

The apparatus of claim 28, wherein the management controller is a baseboard management controller.

Example 30

The apparatus of claim 28, the target system comprising a chipset comprising a debug circuit, the management controller coupled to the debug circuit of the chipset, the apparatus comprising: the debug probe means to send a control signal to the debug circuit of the chipset including an indication to implement the debug operation and to receive a control signal from the debug circuit of the chipset including an indication of a debug result; and the network interconnect means to send, via the network, an information element including an indication of the debug result.

Example 31

The apparatus of claim 28, the plurality of debug circuit pins comprising at least an input pin, an output pin, a reset pin, a mode select pin, and a clock pin.

Example 32

The apparatus of claim 26, the processor a first processor and the debug operation a first debug operation, the target system comprising a second processor comprising a debug circuit, the management controller coupled to the debug circuit of the second processor, the apparatus comprising: the network interconnect means to receive, via the network, an information element including an indication of a second debug operation to apply to the second processor; and the debug probe means to send a control signal to the debug circuit of the second processor including an indication to implement the second debug operation.

Example 33

A computer-readable storage medium that stores instructions for execution by processing circuitry of a management controller of a target system, the target system comprising at least one processor comprising a debug circuit and the management controller coupled to the debug circuit of the processor, the instructions to cause the management controller to: receive, via a network, an information element including an indication of a debug operation; and send a control signal to the debug circuit of the processor including an indication to implement the debug operation.

Example 34

The computer-readable storage medium of claim 33, the instructions to cause the management controller to: receive a control signal from the debug circuit including an indication of a debug result; and send, via the network, an information element including an indication of the debug result.

Example 35

The computer-readable storage medium of claim 33, the debug circuit of the processor comprising a plurality of debug circuit pins, the management controller comprising a plurality of debug circuit pins operably coupled to respective ones of the plurality of debug circuit pins of the debug circuit of the processor, the instructions to cause the management controller to: apply a voltage to a one of the plurality of debug circuit pins of the debug circuit of the processor to send the control signal to the debug circuit of the processor; and read a voltage from one of the plurality of debug circuit pins of the debug circuit of the processor to receive the control signal to the debug circuit of the processor.

Example 36

The computer-readable storage medium of claim 35, wherein the management controller is a baseboard management controller.

Example 37

The computer-readable storage medium of claim 35, the target system comprising a chipset comprising a debug circuit, the management controller coupled to the debug circuit of the chipset, the instructions to cause the management controller to: send a control signal to the debug circuit of the chipset including an indication to implement the debug operation; receive a control signal from the debug circuit of the chipset including an indication of a debug result; and send, via the network, an information element including an indication of the debug result.

Example 38

The computer-readable storage medium of claim 35, the plurality of debug circuit pins comprising at least an input pin, an output pin, a reset pin, a mode select pin, and a clock pin.

Example 39

The computer-readable storage medium of claim 35, the processor a first processor and the debug operation a first debug operation, the target system comprising a second processor comprising a debug circuit, the management controller coupled to the debug circuit of the second processor, the instructions to cause the management controller to: receive, via the network at the management controller, an information element including an indication of a second debug operation to apply to the second processor; and send a control signal to the debug circuit of the second processor including an indication to implement the second debug operation.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
a processor comprising a debug circuit, the debug circuit comprising a debug port; and
a management controller coupled to the debug circuit of the processor, the management controller comprising logic, at least a portion of which is implemented in hardware, the logic to:
receive, over a network, an information element including an indication of a debug operation; and
send, via at least one of a plurality of debug circuit pins of the management controller, a control signal to at least one of a plurality of debug circuit pins of the debug port of the debug circuit including an indication to implement the debug operation, the plurality of debug circuit pins of the management controller operably coupled to respective ones of the plurality of debug circuit pins of the debug port, the debug circuit to apply the debug operation to the processor without a test probe coupled to the debug port.

2. The apparatus of claim 1, the management controller comprising logic to:
receive, via at least one of the plurality of debug circuit pins of the management controller, a control signal from the debug circuit including an indication of a debug result; and
send, via the network, an information element including an indication of the debug result.

3. The apparatus of claim 1, the management controller comprising a baseboard management controller (BMC), the BMC comprising logic to:
encode the information element received over the network into at least one packet, wherein the BMC sends the at least one packet to the debug port of the debug circuit via the plurality of debug circuit pins of the BMC.

4. The apparatus of claim 1, comprising a chipset comprising a debug circuit, the management controller coupled to the debug circuit of the chipset and comprising logic to:
send, via at least one of the plurality of debug circuit pins of the management controller, a control signal to the debug circuit of the chipset including an indication to implement a debug operation to be applied to the chipset without coupling a test probe to a debug port of the debug circuit of the chipset;
receive, via at least one of the plurality of debug circuit pins of the management controller, a control signal from the debug circuit of the chipset including an indication of a debug result of the debug operation applied to the chipset; and
send, via the network, an information element including an indication of the debug result.

5. The apparatus of claim 1, the management controller comprising logic to apply a voltage to a one of the plurality of debug circuit pins of the management controller to send the control signal to the debug port.

6. The apparatus of claim 5, the management controller comprising logic to read a voltage from one of the plurality of debug circuit pins of the debug port to receive a response from the debug circuit of the processor.

7. The apparatus of claim 1, the plurality of debug circuit pins comprising at least an input pin, an output pin, a reset pin, a mode select pin, and a clock pin.

8. The apparatus of claim 1, the processor a first processor and the debug operation a first debug operation applied to the first processor, the apparatus comprising a second processor comprising a debug circuit, the management controller coupled to the debug circuit of the second processor and comprising logic to:
receive, over a network, an information element including an indication of a second debug operation to apply to the second processor; and
send, via at least one of the plurality of debug circuit pins of the management controller, a control signal to the debug circuit of the second processor including an indication to implement the second debug operation on the second processor.

9. A system comprising:
at least one target system, comprising:
a processor comprising a debug circuit, the debug circuit comprising a debug port; and
a management controller coupled to the debug circuit of the processor, the management controller comprising logic, at least a portion of which is implemented in hardware, the logic to:
receive, via a network, an information element including an indication of a debug operation; and
send, via at least one of a plurality of debug circuit pins of the management controller, a control signal to at least one of a plurality of debug circuit pins of the debug port of the debug circuit including an indication to implement the debug operation on the processor, the plurality of debug circuit pins of the management controller operably coupled to respective ones of the plurality of debug circuit pins of the debug port, the debug circuit to apply the debug operation to the processor without a test probe coupled to the debug port.

10. The system of claim 9, the management controller comprising logic to:
receive, via at least one of the plurality of debug circuit pins of the management controller, a control signal from the debug circuit including an indication of a debug result; and
send, via the network, an information element including an indication of the debug result.

11. The system of claim 9, the management controller comprising a baseboard management controller (BMC), the BMC comprising logic to: encode the information element received over the network into at least one packet, wherein the BMC sends the at least one packet to the debug port of the debug circuit via the plurality of debug circuit pins of the BMC.

12. The system of claim 9, the target system comprising a chipset comprising a debug circuit, the management controller coupled to the debug circuit of the chipset and comprising logic to:
send, via at least one of the plurality of debug circuit pins of the management controller, a control signal to the debug circuit of the chipset including an indication to implement a debug operation to be applied to the chipset without coupling a test probe to a debug port of the debug circuit of the chipset;
receive, via at least one of the plurality of debug circuit pins of the management controller, a control signal from the debug circuit of the chipset including an indication of a debug result of the debug operation applied to the chipset; and
send, via the network, an information element including an indication of the debug result.

13. The system of claim 9, the management controller comprising logic to apply a voltage to a one of the plurality of debug circuit pins of the management controller to send the control signal to the debug port.

14. The system of claim 13, the management controller comprising logic to read a voltage from one of the plurality of debug circuit pins of the debug port to receive a response from the debug circuit of the processor.

15. The system of claim 9, the plurality of debug circuit pins comprising at least an input pin, an output pin, a reset pin, a mode select pin, and a clock pin.

16. The system of claim 9, the processor a first processor and the debug operation a first debug operation applied to the first processor, the target system comprising a second processor comprising a debug circuit, the management controller coupled to the debug circuit of the second processor and comprising logic to:
receive, over a network, an information element including an indication of a second debug operation to apply to the second processor; and
send, via at least one of the plurality of debug circuit pins of the management controller, a control signal to the debug circuit of the second processor including an indication to implement the second debug operation on the second processor.

17. A method comprising:
receiving, via a network at a management controller for a target system, an information element including an indication of a debug operation, the target system comprising at least one processor comprising a debug circuit, the debug circuit comprising a debug port, and a plurality of debug circuit pins of the management controller coupled to a plurality of debug circuit pins of the debug port of the debug circuit; and
sending, by at least one of the plurality of debug circuit pins of the management controller, a control signal to at least one of the plurality of debug circuit pins of the debug port including an indication to implement the debug operation, the plurality of debug circuit pins of the management controller operably coupled to respective ones of the plurality of debug circuit pins of the debug port, the debug circuit to apply the debug operation to the processor without a test probe coupled to the debug port.

18. The method of claim 17, comprising:
receiving, via at least one of the plurality of debug circuit pins of the management controller, a control signal from the debug circuit including an indication of a debug result; and
sending, via the network, an information element including an indication of the debug result.

19. The method of claim 17, comprising:
applying a voltage to a one of the plurality of debug circuit pins of the debug circuit of the processor to send the control signal to the debug circuit of the processor; and
reading a voltage from one of the plurality of debug circuit pins of the debug circuit of the processor to receive the control signal to the debug circuit of the processor.

20. The method of claim 17, wherein the management controller is a baseboard management controller (BMC), the method further comprising:
encoding, by the BMC, the information element received over the network into at least one packet, wherein the BMC sends the at least one packet to the debug port of the debug circuit via the plurality of debug circuit pins of the BMC.

21. A computer-readable storage medium that stores instructions for execution by processing circuitry of a management controller of a target system, the target system comprising at least one processor comprising a debug circuit, the debug circuit comprising a debug port, and the management controller coupled to the debug circuit of the processor, the instructions to cause the management controller to:
receive, over a network, an information element including an indication of a debug operation; and
send, via at least one of a plurality of debug circuit pins of the management controller, a control signal to at least one of a plurality of debug circuit pins of the debug port of the debug circuit including an indication to implement the debug operation, the plurality of debug circuit pins of the management controller operably coupled to respective ones of the plurality of debug circuit pins of the debug port, the debug circuit to apply the debug operation to the processor without a test probe coupled to the debug port.

22. The computer-readable storage medium of claim 21, the instructions to cause the management controller to:
receive, via at least one of the plurality of debug circuit pins of the management controller, a control signal from the debug circuit including an indication of a debug result; and
send, via the network, an information element including an indication of the debug result.

23. The computer-readable storage medium of claim 21, the instructions to cause the management controller to:
apply a voltage to a one of the plurality of debug circuit pins of the management controller to send the control signal to the debug port; and
read a voltage from one of the plurality of debug circuit pins of the debug port to receive a response from the debug circuit of the processor.

* * * * *